Patented Apr. 2, 1946

2,397,633

UNITED STATES PATENT OFFICE 2,397,633

ARACHNICIDES

William P. ter Horst, Pompton Plains, N. J., assignor to United States Rubber Company, New York, N. Y., a corporation of New Jersey No Drawing. Application June 28, 1944,
Serial No. 542,611

6 Claims. (Cl. 167—30)

This invention relates to improvements in arachnicides.

I have found that N-isopropylidene-p-ethoxy-aniline is effective for control of arachnids. The term "arachnid" is used, in its broad sense to include spiders, mites, ticks, and the like. The structure of N-isopropylidene-p-ethoxy-aniline may be represented as follows:

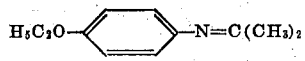

The compound and method of preparation are described by Knoevenagel, Berichte der Deutschen Chemischen Gesellschaft, vol. 54B, page 1730 (1921). It is there called "acetone-p-phenetidil." It has also been called N-isopropylidene-phenetidene.

The N-isopropylidene-p-ethoxy-aniline may be applied diluted or undiluted, mixed with carriers, with other arachnicides, or with fungicides, insecticides, insect repellents, fertilizers, plant hormones, buffering or safening agents. It may be applied as a dust, alone or diluted with a suitable carrier, such as clay or talc, or in solution in a suitable organic solvent, or in suspension in a non-solvent, as in an aqueous medium. The N-isopropylidene-p-ethoxy-aniline may be used to control Arachnida of the order which infest plants, such as red spider, brown mite, European red mite, citrus red mite, and also those which infest man, domestic animals, fowls, etc.

The following example illustrates the invention by the killing action of N-isopropylidene-p-ethoxy-aniline on *Tetranychus telarius*, commonly known as red spider. In these tests aqueous suspensions of .25 and .5% of N-isopropylidene-p-ethoxy-aniline were prepared with .25% of Nacconal NR, a proprietary dispersing agent which is a sulfonated condensation product of chlorinated kerosene with benzene. Young bean plants, with first true leaves fully expanded, were heavily infested with red spider, and then sprayed with the aqueous suspensions of N-isopropylidene-p-ethoxy-aniline. Insect counts were taken after 72 hours. Control plants were sprayed with water containing .25% of Nacconal NR but no other added chemical. The results of the insect counts are shown in the following table and illustrate the great potency of N-isopropylidene-p-ethoxy-aniline as an arachnicide.

| Percent N-isopropylidene-p-ethoxy-aniline in aqueous suspension | Percent dead after 72 hours | |
|---|---|---|
| | Treated plants | Control |
| 0.5 | 100 | 3 |
| 0.25 | 95 | 8 |

It may be seen from the above that N-isoproylidene-p-ethoxy-aniline is an effective arachnicide.

Having thus described my invention, what I claim and desire to protect by Letters Patent is:

1. An arachnicidal preparation comprising an aqueous suspension of N-isopropylidene-p-ethoxy-aniline.

2. An arachnicidal preparation comprising an aqueous suspension of N-isopropylidene-p-ethoxy-aniline containing a dispersing agent.

3. The method of protecting plants subject to attack by arachnids which comprises applying N-isopropylidene-p-ethoxy-aniline to said plants.

4. The method of protecting plants subject to attack by arachnids which comprises spraying said plants with an aqueous suspension of N-isopropylidene-p-ethoxy-aniline.

5. The method which comprises applying N-isopropylidene-p-ethoxy-aniline to loci to be protected against arachnids.

6. The method of controlling arachnids which comprises treating the arachnids with N-isopropylidene-p-ethoxy-aniline.

WILLIAM P. TER HORST.